United States Patent

Warner et al.

[15] 3,640,736
[45] Feb. 8, 1972

[54] TARNISH-PREVENTIVE COMPOSITION COMPRISING HYDROXY-CONTAINING THIOL SULFIDES

[72] Inventors: Paul F. Warner, Phillips; Edward E. Huxley, Borger, both of Tex.

[73] Assignee: Phillips Petroleum Company

[22] Filed: Sept. 1, 1970

[21] Appl. No.: 68,759

Related U.S. Application Data

[62] Division of Ser. No. 751,060, Aug. 8, 1968, Pat. No. 3,567,782.

[52] U.S. Cl. ................................106/3, 106/14, 117/127, 148/6.24, 252/161, 252/395
[51] Int. Cl. ..............................................C08h, C09d, C09q
[58] Field of Search..............................106/3–10, 14, 287 S; 260/609; 117/127; 148/6.24; 252/161, 395

[56] References Cited

UNITED STATES PATENTS 3,567,782  3/1971  Warner et al.........................260/609

OTHER PUBLICATIONS

Culvenor et al.: "J. Chem. Soc." (1949), pp. 278–282.
Owen et al.: "Chem. Abstracts", Vol. 46, p. 9058 (1952).

*Primary Examiner*—Joan B. Evans
*Attorney*—Young and Quigg

[57] ABSTRACT

A tarnish-preventive composition for silver and copper surfaces comprising:

a. hydroxy-substituted mercapto sulfides having the formula

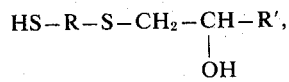

b. An abrasive, and c. the balance a diluent.

2 Claims, No Drawings

TARNISH-PREVENTIVE COMPOSITION COMPRISING HYDROXY-CONTAINING THIOL SULFIDES

RELATED INVENTIONS

This application is a divisional application of our copending application having Ser. No. 751,060, filed Aug. 8, 1968 now U.S. Pat. No. 3,567,782.

BACKGROUND OF THE INVENTION

This invention relates to a heavy mercaptan compound. In another aspect, this invention relates to a hydroxy-substituted mercapto sulfide which is effective as a tarnish inhibitor. In accordance with a further aspect, this invention relates to a hydroxy-substituted mercapto sulfide useful as tarnish inhibitor for silver, copper, and other tarnishable metals. In accordance with another aspect, this invention relates to a method for producing hydroxy-substituted mercapto sulfides by the reaction of a dimercaptan with a long chain epoxide.

Tarnishable metals such as silver and copper are well known to tarnish rapidly in normal atmospheres. A housewife who owns silverware, a silver service, or copper utensils, finds it necessary to polish these utensils frequently in order to maintain their attractive appearance.

A number of antitarnish agents have been suggested to prevent the tarnish of silver or copper. IN general, these compounds attach to the metal, forming a thin invisible film which prevents the attack of sulfur or oxygen on the metal. While the antitarnish agents of the prior art can be used alone, it is generally preferred, for household use, to incorporate such agents into a paste or liquid composition. Such a polishing compound will remove old tarnish through incorporation of a light abrasive agent, and it will simultaneously treat the clean surface with the antitarnish agent to prevent future tarnish.

Accordingly, an object of this invention is to provide effective tarnish inhibiting agents for silver, copper and other metals.

It is another object of this invention to provide an improved antitarnish agent and polish composition containing the same.

A further object of this invention is to provide an improved process for the production of hydroxy-substituted mercapto sulfides.

Other aspects, objects, as well as the several advantages of this invention will be apparent to those skilled in the art upon reading the disclosure and appended claims.

SUMMARY OF THE INVENTION

The novel compounds of the invention have the general formula represented by

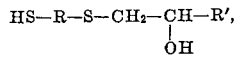

wherein R is an alkylene group having one to five carbon atoms, inclusive, and R' is a saturated aliphatic radical having from 10 to 20 carbon atoms, inclusive.

Further, according to the invention, tarnish-preventive compositions are provided comprising a hydroxy-substituted mercapto sulfide having the general formula defined above, an abrasive, and the balance a diluent and optionally an odorizer and/or a suspending agent.

The compounds falling within this generic formula have very little odor and display good tarnish inhibition when applied to tarnishable metals such as silver and copper.

The novel compounds of the invention are conveniently prepared by the interreaction of a long chain epoxide having 12 to 22 carbon atoms with a dimercaptan having the formula HS—R—SH wherein R is an alkylene group containing one to five carbon atoms in the presence of a catalyst. A presently preferred catalyst is an alkali metal hydroxide in an alcoholic solution. More preferably, sodium hydroxide is employed as a catalyst.

DESCRIPTION OF PREFERRED EMBODIMENT

Hydroxy-substituted mercapto sulfide compounds produced according to the invention falling within the scope of the generic formula set forth above include:

mercaptomethyl 2-hydroxypentadecyl sulfide
2-mercaptoethyl 2-hydroxyhexadecyl sulfide
3-mercaptoethyl 2-hydroxyheptadecyl sulfide
4-mercaptobutyl 2-hydroxyoctadecyl sulfide
5-mercaptoamyl 2-hydroxyoctadecyl sulfide
2-mercaptoethyl 2-hydroxyoctadecyl sulfide
2-mercaptoethyl 2-hydroxydocosyl sulfide The currently most preferred compounds falling within the group above include the hydroxy-substituted mercapto sulfides produced by the reaction of 1,2-ethanedithiol with a straight chain epoxide containing 12 to 22 carbon atoms. This product has been found to be a superior tarnish inhibitor for silver.

Other dimercaptans that can be employed include 1,3-propanedithiol, 1,4-butanedithiol, and 1,5-pentanedithiol. If desired, mixtures of the dimercaptans can be employed when desired.

Representative examples of suitable epoxides that can be employed include pentadecylene oxide, hexadecylene oxide, heptadecylene oxide, octadecylene oxide, or mixtures of these. The These relative amounts of reactants which are to be employed with be dictated by the type of product which is desired. Generally, the mole ratio of dimercaptan to epoxide is broadly 20:1 to 1:1, and preferably 5:1 to 1.5:1.

In carrying out the method of the invention, the epoxide and dimercaptan are ordinarily contacted at a reaction temperature of 75° to 300° F., preferably 175° to 225° F. and for a period of time from 30 minutes to 5 hours.

Acids or bases may be used as catalysts for this reaction. A catalyst, for example, sodium hydroxide, is employed in catalytic amounts of from about 0.05 to 2 percent by weight, based on the amount of epoxide charged to the reaction. Sodium methylate, sodium ethylate, or other basic materials, such as amines, may be used. After the reaction is complete the product can be recovered by any conventional means, such as by vacuum or fractional distillation from the reaction mixture.

The compounds of the invention find utility in the many known areas where mercaptans are usable, and particularly where the normal odor associated with mercaptan compounds is objectionable. Because of the very low odor of the compounds of this invention, they can be used in conjunction with paint, sealing compounds, silver polish compositions, and so forth. The compounds find particular utility in making of silver and copper polish compositions. These compounds not only have a very low odor necessary for successful polish compositions, but have excellent tarnish-inhibiting properties. For such an application the compounds would normally be mixed with a light abrasive agent such as chalk, silica alumina, a diluent such as water, or a lower alcohol and a suspending agent. Perfumes may be added if desired.

While the compounds may be directly applied to previously cleaned metal, in the preferred embodiment the antitarnish agent will be compounded into a polishing composition. Abrasive powders that can be included or employed, such as chalk, silica, or alumina, are known in the prior art as illustrated in U.S. Pat. No. 2,205,115.

The satisfactory polishing composition will also include a diluent. The amount of diluent will depend upon the consistency of the polishing compound desired. Generally 1 to 90 weight percent of polar solvent can be used as a diluent, with water or a lower alcohol being preferred.

In order to prevent the abrasive powder from settling out of suspension, a small quantity of a suspending agent should be employed. Such agents are well known to those skilled in the art.

For example, a silver polish composition can be compounded with the following general ranges: 1 to 50 weight percent of a hydroxy-substituted mercapto sulfide of the invention, 5 to 98 weight percent abrasive, 0 to 5 weight percent odorizer, and 0 to 1 weight per cent suspending agent. Sufficient diluent, e.g., 1–90 weight percent, is then added to form a composition of the desired consistency.

EXAMPLE I

The antitarnish agent 2-mercaptoethyl-2'-hydroxypentadecyl sulfide was prepared by the reaction of 1,2-ethanedithiol with a saturated straight chain $C_{15}$–$C_{18}$ hydrocarbon with a terminal epoxy group using alcoholic sodium hydroxide as the catalyst. The hydroxy-substituted mercapto sulfide produced gave a top crude yield of 67 mole percent with about 50 weight percent mercaptan purity. A portion of the crude was purified by taking it overhead in a Brush still. The overhead product represented a 58 mol percent yield and had a mercaptan purity of about 97 percent.

The equipment used included a three-necked flask equipped with a reflux condenser, dropping funnel and a variable speed stirrer. The reaction temperature was controlled by means of a heating mantle and Variac.

The mercaptan was prepared in the following manner: the 1,2-ethanedithiol (4.4 moles) containing 2 weight percent of a saturated solution of sodium hydroxide in ethanol as catalyst was placed in the reactor. The reactor was heated to 200° F. The epoxide was added dropwise to the reactor over a period of 105 minutes. The temperature was maintained between 195° and 220° F. during the addition. After all of the epoxide was added, the reactor was held at 215° to 220° F. for an additional 4 hours to allow the reaction to go to completion. The catalyst was not removed from the reaction product.

The reaction product was vacuum flashed at 1 millimeter of mercury and 325° F. A portion of the kettle product from this flash operation was retained for evaluation as a silver tarnish inhibitor.

The remainder of the topped crude was charged to the Brush still. About 66 weight percent of the charge was taken overhead at 65 to 4 microns pressure and a kettle temperature of 290° to 450° F. Approximately 85 weight percent of the overhead material had a mercaptan sulfur content of 9.7 weight percent or a mercaptan purity of 97 weight percent (theoretical mercaptan sulfur is 9.95 weight percent).

Properties of the epoxide feed and the crude purified mercaptan product made from it are listed in Table I.

TABLE I

Properties of Feedstock and Products from Synthesis of High Molecular Weight 1-Thiol from Nedox 1518[1] and 1,2-Ethanedithiol

| Property | Olefin Oxide | Topped Crude | Purified Mercaptan |
|---|---|---|---|
| Molecular Weight | 237 | 421 | 322 |
| Mercaptan Sulfur Wt. % | — | 5.0 | 9.7 |
| Mercaptan Purity, Wt. % | — | 52 | 97 |
| Melting Point, °F. | 55–80 | 138–147 | 104–105 |
| Composition[2] | | | |
| Lights 1 | 2.6 | — | — |
| 2 | 0.9 | — | — |
| 3 | 2.3 | — | — |
| 4 | 1.8 | — | — |
| 5 | 0.9 | — | — |
| 6 | 3.5 | — | — |
| Oxide 15 | 26.3 | — | — |
| Unknown | 1.9 | — | — |
| Oxide 16 | 28.8 | — | — |
| Oxide 17 | 19.9 | — | — |
| Oxide 18 | 9.9 | — | — |
| Heavies | 1.2 | — | — |
| | 100.0 | | |

1. Nedox 1518 is a straight saturated chain with a terminal epoxy group, with $C_{15}$ to $C_{18}$ chain length, sold by ADM Chemicals.

2. Weight percent by chromatograph.

The material balance data for the topped crude and purified mercaptan made from the oxide are given in Table II.

TABLE II

Material Balance Data for High Molecular Weight 1-Thiol from Nedox 1518[1] and 1,2-Ethanedithiol

| Charge to Reactor | Grams | Moles | Recovery,[2] Mol Percent |
|---|---|---|---|
| 1,2-Ethanedithiol | 417 | 4.43 | — |
| Nedox 1518[1] | 574 | 2.42 | — |
| Ethanolic caustic | 19 | — | — |
| | 1,010 | 6.85 | |
| Reactor Conditions | | | |
| Temperature, °F. | 185–215 | | |
| Pressure | Atm. | | |
| Reaction Time, hours | 2 | | |
| Flash Distillation | | | |
| Charge | 974 | — | — |
| Overhead Product | 290 | 3.08[3] | — |
| Kettle Product | 684[4] | 1.62 | 67.0 |
| Brush Still Distillation | | | |
| Charge | 556 | — | — |
| Overhead Product | 367 | 1.14 | 57.8 |
| Kettle Product | 189 | — | — |

Yield, Pounds of 50 weight percent material as kettle product from flash distillation per pound of Nedox was 1.19.

Yield, Pounds of 97 weight percent product as overhead fraction from Brush still per pound of Nedox was 0.79.

1. Nedox 1518 is a straight saturated chain with a terminal epoxy group, with $C_{15}$ to $C_{18}$ chain length, sold by ADM Chemicals.

2. Based on Nedox 1518 and 100 percent recovery.

3. Assumed to be 1,2-ethanedithiol.

4. About 50 percent mercaptan by mercaptan sulfur.

EXAMPLE II

The 2-mercaptoethyl-2'-hydroxy $C_{15}$–$C_{18}$ sulfide product produced according to Example I exhibited excellent antitarnish inhibition characteristics. A formulation was made of the inhibitor of the invention, as well as known tarnish inhibitors using a water suspension of the tarnish inhibitor and a polishing grit. These polishes were made as follows:

4.19 percent or 1.4 grams tarnish inhibitor to be evaluated
5.98 percent or 2.0 grams liquid Ivory detergent
14.97 percent or 5.0 grams Bon Ami polishing grit
74.85 percent or 25.0 grams of water.

Silver test strips were cleaned with the polishes formed as noted above and were suspended in a desiccator containing a controlled hydrogen sulfide atmosphere of 200–300 p.p.m. by volume by adding 1 ml. of a 1 weight percent sodium hydrosulfide water solution to 100 ml. of water in a desiccator. The tarnish inhibitors tested exhibited varying degrees of tarnish inhibition.

After about 24 hours exposure, the silver strip had a light tarnish for the specimen treated with the 2-mercaptoethyl-2'-hydroxy $C_{15}$–$C_{18}$ sulfide produced according to Example 1. Specimens treated with known prior art inhibitors had a heavy tarnish after about the same length of exposure. In fact, some of the prior art inhibitors were heavily tarnished after only about 8 hours exposure.

EXAMPLE II

In another test using 10 percent solution of an inhibitor in toluene and applied to silver strips which had been polished with Bon Ami, washed and dried before application of the toluene solution, it was again found that the inhibitor of the invention produced according to Example I was only lightly tarnished after over 20 hours exposure to $H_2S$.

In one test, silver was cleaned with Bon Ami and coated with 10 percent solution of the inhibitor and then exposed to 1 ml. of 1 percent sodium hydrosulfide solution in 100 ml. water.

The inhibitor of the invention exhibited a higher rating as a tarnish inhibitor compared to some of the known prior art tarnish inhibitors tested under the same conditions.

We claim:

1. A tarnish preventive composition for silver and copper surfaces comprising
   a. from about 1 to about 50 percent by weight of at least one compound of the formula

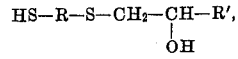

wherein R is an alkylene group having one to five carbon atoms and R' is a saturated aliphatic hydrocarbon having from 10 to 22 carbon atoms,
   b. from about 5 to 98 percent by weight of an abrasive, and
   c. the balance a polar solvent.
2. A composition according to claim 1 wherein said compound is 2-mercaptoethyl-2'-hydroxypentadecyl sulfide.

* * * * *